(12) United States Patent
Picard et al.

(10) Patent No.: US 11,010,177 B2
(45) Date of Patent: May 18, 2021

(54) COMBINING COMPUTER APPLICATIONS

(71) Applicant: Hewlett Packard Enterprise Development LP, Houston, TX (US)

(72) Inventors: Jean-Charles Picard, Grasse (FR); Jean Michel Dias-Vaz, Mougins (FR); Flavien Bossiaux, Mougins (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 57 days.

(21) Appl. No.: 16/225,465

(22) Filed: Dec. 19, 2018

(65) Prior Publication Data

US 2020/0042333 A1 Feb. 6, 2020

(30) Foreign Application Priority Data

Jul. 31, 2018 (EP) .................................... 18306039

(51) Int. Cl.
*G06F 9/451* (2018.01)
*G06F 3/0482* (2013.01)
*G06F 9/54* (2006.01)
*H04L 29/08* (2006.01)

(52) U.S. Cl.
CPC ............ *G06F 9/451* (2018.02); *G06F 3/0482* (2013.01); *G06F 9/541* (2013.01); *H04L 67/32* (2013.01)

(58) Field of Classification Search
CPC ........ G06F 8/34; G06F 3/0481; G06F 3/0482; G06F 9/44; G06F 9/54; G06F 9/451; G06F 9/541
See application file for complete search history.

(56) References Cited

U.S. PATENT DOCUMENTS

| | | | |
|---|---|---|---|
| 6,424,360 B1* | 7/2002 | Torres ..................... | G06F 9/451 715/810 |
| 8,126,984 B2 | 2/2012 | Vogler et al. | |
| 2003/0046401 A1 | 3/2003 | Abbott et al. | |
| 2005/0086636 A1* | 4/2005 | Sobeski .................. | G06F 9/451 717/103 |
| 2006/0244585 A1* | 11/2006 | Bishop .................... | H04M 3/10 340/506 |
| 2007/0101291 A1* | 5/2007 | Forstall ................. | G06F 3/0482 715/805 |

(Continued)

FOREIGN PATENT DOCUMENTS

EP 3015984 A1 5/2016

OTHER PUBLICATIONS

Extended European Search Report Received for EP Patent Application No. 18306039.1, dated Feb. 12, 2019, 9 pages.

(Continued)

*Primary Examiner* — Sang H Kim (74) *Attorney, Agent, or Firm* — Nolte Lackenbach Siegel (57) ABSTRACT

Example implementations relate to combining computer applications by adding a new computer application to a common access point. The new computer application accesses a new data source via the common access point. The new computer application is associated with an existing computer application. The existing computer application accesses an existing data source via the common access point. The existing computer application is executed to access the existing data source. Additionally, the new computer application is executed to access the new data source in response to a selection of the association.

20 Claims, 7 Drawing Sheets

(56) References Cited

U.S. PATENT DOCUMENTS

| | | |
|---|---|---|
| 2007/0300185 A1 | 12/2007 | Macbeth et al. |
| 2008/0229280 A1* | 9/2008 | Stienhans ................. G06F 8/34 |
| | | 717/107 |
| 2010/0153865 A1* | 6/2010 | Barnes .................... H04L 67/10 |
| | | 715/762 |
| 2010/0197238 A1* | 8/2010 | Pathuri ............... H04L 43/0817 |
| | | 455/67.11 |
| 2010/0333037 A1 | 12/2010 | Pavlovski et al. |
| 2016/0219143 A1* | 7/2016 | Zilles ................... H04M 3/242 |

OTHER PUBLICATIONS

Peter Parente, "Clique: a Conversant, Task-based Audio Display for GUI Applications," ACM SIGACCESS Accessibility and Computing, Jan. 27, 2006, pp. 34-37, Issue 84, ACM.

* cited by examiner

COMBINING COMPUTER APPLICATIONS

PRIORITY INFORMATION

This application claims priority to EP Application No. 18306039.1, filed on Jul. 31, 2018. The contents of which are incorporated herein by reference in its entirety.

BACKGROUND

A computer application may be software that performs a unit of work, such as taking a customer order for a company service. The computer application may be a single software component, or may include multiple components, such as a client and a server. A client is a part of the computer application that provides an interface between a computer system and a user, such as a company employee. For example, a customer order client may be a user interface on a computer monitor that the employee uses to place the customer's order. A server may be a part of the computer application that retrieves information for display on the computer monitor, and takes some action related to the work being performed. For example, a customer order server may store a record of the customer order in a database and initiate an automated process to fulfill the order. In some cases, the client and the server may run on different computer systems.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

A computer application may represent one unit of work in a larger suite of computer applications for a specific business function. For example, the customer order computer application described above may be included in a suite of computer applications used for a company's customer service function. A suite of computer applications such as this is referred to herein as a software product.

Companies may use multiple software products that cover a range of business functions. For example, an assurance system may be used to monitor a communication company's networks. An assurance system is a software product referred to as an operational support system. Operational support systems (OSS) may be used for different management functions and may also include ticket system. Ticket systems report and track problems with communication networks. Another type of OSS is a service level agreement (SLA) system. An SLA may be an agreement between a company and a customer that documents the services for, and standards by which the services are provided to, each client. An SLA system may thus enable a communications company to ensure that the terms of the SLA are being met.

While each OSS system may be a different software product, it may be useful to combine the different software products when there is a relationship between the data being used. For example, the assurance system may provide a screen view that shows that a network component has failed. In such a case, it may be useful to create a problem ticket on the ticket system with the information being presented on the assurance system. More specifically, it may be useful to combine the computer application in the assurance system that shows the component failure with the computer application in the ticket system that lets a user press a button to create a problem ticket. However, the assurance system and the ticket system may be developed by different organizations, e.g., different businesses, business units, or the customer's teams. As such, combining their computer applications in useful ways may mean developing new computer applications, which may be expensive.

Accordingly, examples of the present disclosure provide a common access point to different, but related, software products. The common access point may be a centralized computer architecture that hosts multiple installed software products and a common interface for accessing the software products. Additionally, such examples may provide a way to combine the computer applications at the common access point using the software product as installed, and without incurring the expense of a software development effort.

Figure 1:
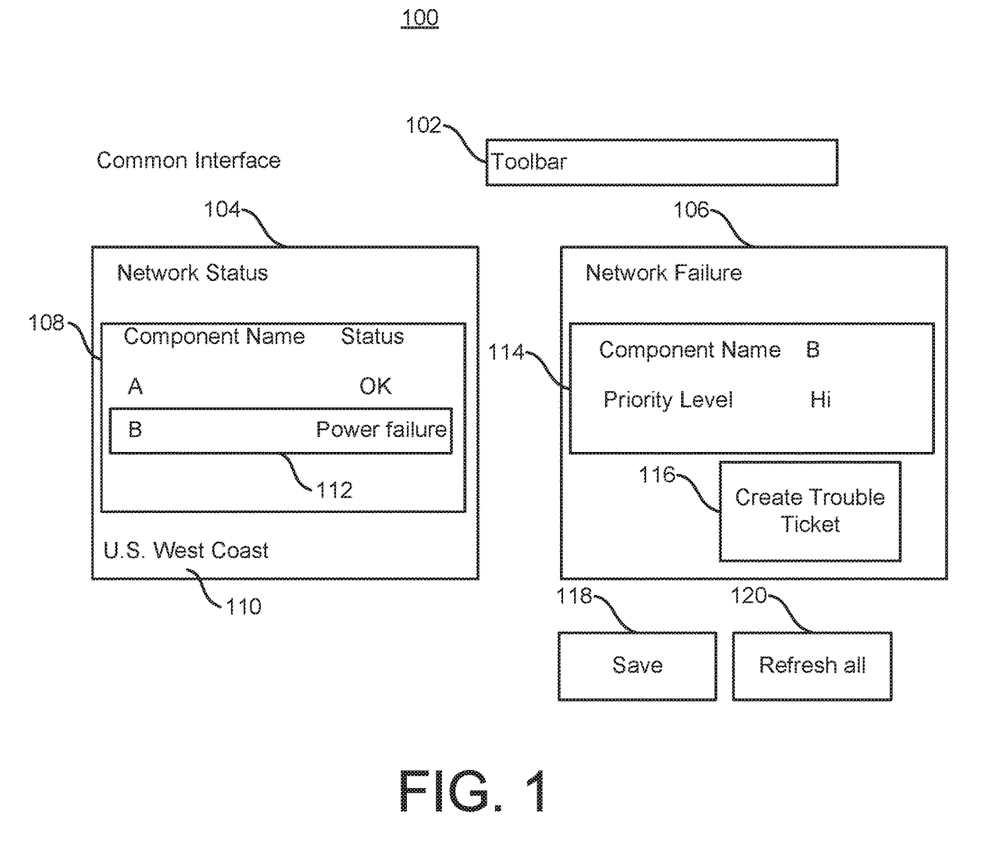
FIG. 1 is an example common interface for combining computer applications.

FIG. 1 is an example common interface 100 for combining computer applications. The common interface 100 may provide access to combine and operate software products installed at a common access point. The common access point may be a centralized computer architecture that hosts multiple installed software products and the common interface 100. The common access point is described in greater detail with respect to FIG. 6. In examples, the common interface 100 may be used to configure multiple computer applications from multiple software products to work in combination. Once combined, the common interface 100 may be used to execute the computer applications.

In examples, the common interface 100 may include a toolbar 102. The toolbar 102 may include menus of multiple, categorized functions that combine the appearance and functionality of multiple computer applications. Some menus may include functions to customize the appearance of the words, pages, sections, footer, header, and various other features of the document. Similarly, the toolbar 102 may provide menus of functions related to configuring the features of combined computer applications. For example, such functions may define layouts, styles, and other options useful in combining user interfaces. User interfaces are also referred to herein as views. Additionally, the toolbar 102 may provide functions related to using the computer applications, i.e., invoking their execution. In this way, the toolbar 102 may provide the ability to create a customized combination of computer applications, and to execute the combination. The toolbar 102 is described further with respect to FIG. 5.

Referring back to FIG. 1, in the example common interface 100, a network status view 104 is combined with a network failure view 106. The views 104, 106 may represent the user interfaces of two combined computer applications: a network status computer application from an assurance system, and a network failure computer application from a ticket system.

In examples, views may contain widgets. Widgets may be the parts of the view that show data and enable a user to take an action, such as, lists of data, labels, data entry fields, checkboxes, clickable buttons, and so on. For example, the network status view 104 includes a list widget 108 and a label widget 110. The list widget 108 is a list showing two rows of data with a "Component Name" and a "Status." The row for network component "A" shows the status is "OK," but the row for network component "B" shows a "Power Failure" status. The label widget 110 indicates "U.S. West Coast." In this example, the label widget 110 may represent a filter. A filter may be one or more data parameters used by a computer application to select specific information from a database or a data server. Filtering data is useful in several ways, such as limiting the amount of data shown in a view to a manageable size. Thus, instead of the OSS operator attempting to monitor components on networks that may span the globe, the network status view 104 may limit the network components shown to those located on the "U.S. West Coast." This filter may be applied by the network status computer application, which may use the regional indicator as a filter to limit the number of components shown in the network status view 104.

The network failure view 106 includes a data entry widget 114 and a button widget 116. The data entry widget 114 includes data entry fields for a "Component Name" of a network component that has failed, and a "Priority Level" for resolving the network failure. The button widget 116 is labeled, "Create Trouble Ticket." In examples, the button widget 116 may be clicked by the OSS operator to start an automated correction process for the network failure.

In addition to combining the views of computer applications, examples may combine the functionality of computer applications. For example, combining the functionality of the network status and network failure computer applications may enable the OSS operator to generate a network failure ticket when the network status computer application shows a network component failure. In one example, the functionality of the network status and network failure computer applications may be combined by creating an association between the list widget 108 in the network status view 104 and the data entry widget 114 in the network failure view 106. The association may specify that a selection on a row in the list widget 108 results in an execution of the network failure computer application with a filter based on the information in the selected row. In this example, the "Component Name" and "Status" values in the selected row may be used as a filter for an execution of the network failure computer application. Accordingly, a box 112 may indicate that the row for component B has been double-clicked. As such, the "Component Name" in the data entry widget 114 may be populated with the value, "B." In addition, the network failure computer application may automatically populate the "Priority Level" field based on the "Status" of the network component. In this example, the "Power Failure" status may result in the network failure computer application automatically populating the "Priority Level" in the network failure view 106.

In examples, combinations may be created using a single computer application. In one example, different filters may be used in combination for the same computer application. In such a combination, multiple filters may be associated with a computer application, and each filter may be associated with its own view. In this way, the same computer application may be used to show different sets of information. For example, in addition to the network status view 104 with the "U.S. West Coast" filter, the common interface 100 may also include a view (not shown) with a "U.S. East Coast" filter. In this way, copies of the same view for the same computer application may be combined to show different sets of data.

The configuration of a set of combined computer applications is referred to herein as a workspace. In examples, workspaces may be created with combinations that are useful for particular workers, roles, and functions. Accordingly, the common interface 100 includes a save button 118 to store configured workspaces to a digital archive. Workspaces may be saved in profiles for specific users and specific jobs within a company or other organization. Additionally, workspaces may be modified to accommodate changes in a user's workflow. For example, an OSS operator may have the common interface 100 as described above saved in a user profile. However, if a new software product is installed at the common access point, such as an SLA system, the workspace may be changed to incorporate computer applications from the new SLA system. For example, the computer applications in the user profile may be further combined with an SLA computer application to manage the SLA based on the network failure ticket and the network status. In this way, dynamic workspaces may be generated and customized, and made available for re-use by the same person or by people with the same job or role.

Additionally, the common interface 100 includes a "refresh all" button 120. The "refresh all" button 120 may invoke execution of all the combined computer applications in one workspace. Thus, pressing the "refresh all" button 120 in the example common interface 100 may cause the network status and network failure computer applications to execute and re-populate the network status view 104 and the network failure view 106.

It is noted that the example common interface 100 and other examples are described herein with respect to a combination of two computer applications for the sake of clarity. However, examples do not so limit the number of computer applications that may be combined. Rather, examples may set a minimum and maximum for the number of applications that may be combined. When the maximum is reached, functions within the toolbar that add new applications may be disabled. Further, in examples, combinations are not limited to combinations across different software products. Rather, different computer applications within the same software product may be combined. Additionally, as stated previously, combinations also may be created that use a single computer application.

Figure 2:
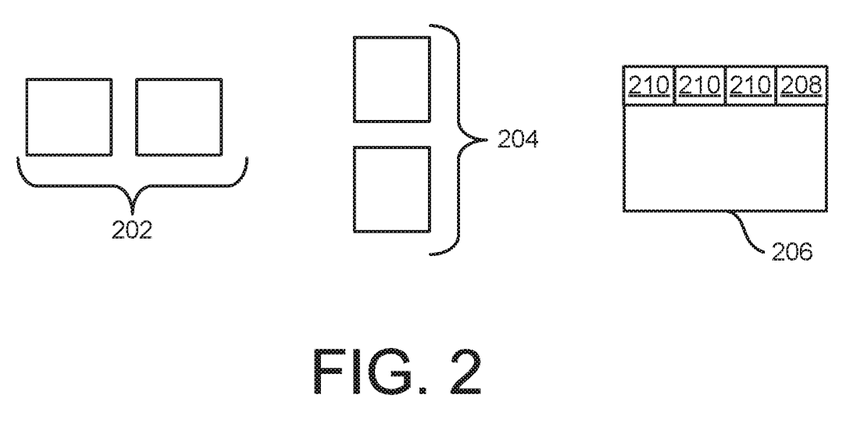
FIG. 2 is an example of potential layouts for combining views of computer applications.

FIG. 2 is an example of potential layouts for combining views of computer applications. When combining the appearance of the combined views, it may be useful to define how the views are presented with respect to each other. Examples provide a column layout 202, row layout 204, and a stacked layout 206 for combined views. It is also possible to apply specific layouts available in a common layout gallery. For example, within a layout of two rows, the first row may include two columns and the second row may include three columns. In the column layout 202, each view may occupy one vertical column of a display. The row layout 204 may present each view in a horizontal row. Additionally, the stacked layout 206 may present each view in a tab-like arrangement. In the stacked layout, each view may be represented by a tab, and may include a visible view 208 and one or more hidden views 210. In the stacked layout, one of the hidden views 210 may be made visible through a user selection, such as a mouse-click on a tab representing the view. In examples, the hidden views 210 may be instantiated even though not being presented. Being instantiated may mean that the associated computer applications are executed and populate the view's widgets even though the hidden views 210 are not visible.

In examples, each view within a layout may be associated with a computer application. Alternatively, the view of a layout may be associated with an additional layout that incorporates multiple views. In this way, flexibility is provided to generate dynamic workspaces. An example of layouts within layouts is described with respect to FIG. 3.

Figure 3:
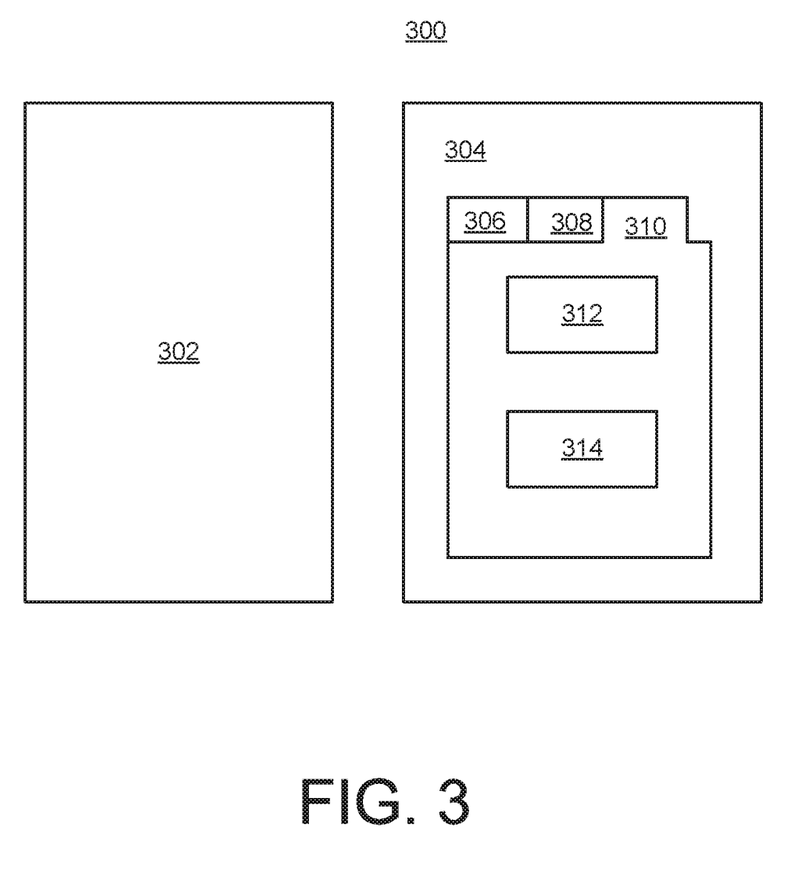
FIG. 3 is an example workspace using multiple layouts for combining computer applications.

FIG. 3 is an example workspace 300 using multiple layouts for combining computer applications. More specifically, the workspace 300 includes views arranged in a column layout, row layout, and stacked layout. In the workspace 300, the views 302, 304 are arranged in the column layout. Each of views 302, 304 occupies a vertical column. While the view 302 may represent the view of a computer application, the view 304 may be a placeholder for other views. More specifically, the view 304 includes views 306, 308, 310 arranged in a stacked layout. Similar to the view 304, the view 310 may be a placeholder. In this example, the view 310 includes views 312, 314, which are arranged in a row layout. The workspace 300 is merely one example of how the views of combined computer applications may be arranged. By providing the ability to place a layout of multiple computer applications within a view, examples provide flexibility in arranging dynamic workflows, and dynamic views of combined computer applications. Accordingly, workspaces may be arranged with complex combinations of computer applications to accommodate various roles for different OSS operators, for example.

In addition to using the described layouts for presenting combined views, examples may also present views in pop-up dialog box. Presenting a view in the pop-up dialog box may mean presenting the view visually to appear to be opening from within another view. The pop-up view may be associated with the same computer application associated within the other view. Alternatively, the pop-up view may be associated with a different computer application. The pop-up view may provide another dynamic element to the workspace for grouping related sets of information.

Figure 4:
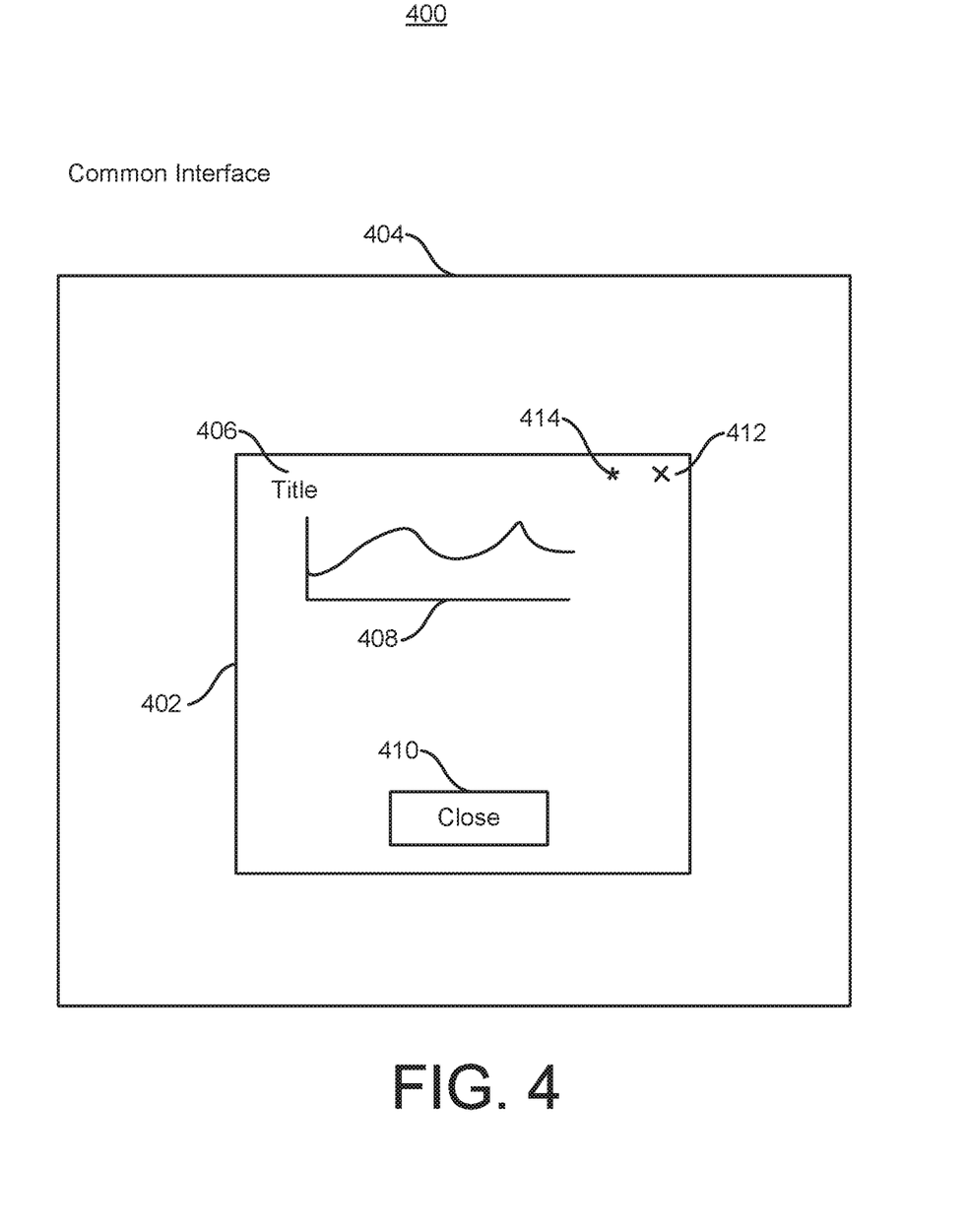
FIG. 4 is an example common interface with a pop-up view for combining computer applications.

FIG. 4 is an example common interface 400 with an example pop-up view 402 for combining computer applications. The common interface 400 may be similar to the common interface 100 described with respect to FIG. 1. Referring back to FIG. 4, the pop-up view 402 is shown within an originating view 404. In examples, the pop-up view 402 may be a modal window, which means the pop-up view 402 is subordinate to the originating view 404. Being subordinate means that the pop-up view 402 may appear in response to a user selection of a widget (not shown) within the originating view 404. Being modal may also mean that when the pop-up view 402 is presented, the originating view 404 remains visible, but is disabled.

The pop-up view 402 includes a title 406, a chart widget 408, a close button widget 410, an "X" icon 412, and a pin icon 414. The title 406 may originate from the associated computer application or may be customized. The chart widget 408 is merely provided as one example of the various types of widgets that may appear in the pop-up view 402.

Further, the chart widget 408 may be populated by executing the associated computer application with a filter selected from the originating view 404. The close button widget 410 may be clicked to close the pop-up view 402. Alternatively, the pop-up view 402 may be closed using a keyboard command, or by clicking on the "X" icon 412 in the upper right corner of the pop-up view 402.

Additionally, in response to a click on the pin icon 414, the pop-up view 402 may be pinned to the workspace. Pinning the pop-up view to the workspace means adding the pop-up view 402 to the workspace. In examples, the pop-up view may also provide a preview feature. In examples, the preview feature may be selected for a pop-up-associated widget in the originating view 404. The preview feature may provide a brief description of information or functionality associated with the pop-up view 402 before the pop-up view 402 is presented. In examples, the pop-up view 402 is not instantiated until the pop-up view 402 is presented on the common interface 400. Thus, if the pop-up view 402 is presented in response to a widget selection in the originating view 404, the pop-up view 402 is not instantiated until the widget selection occurs.

In addition to the layout and pop-up configurations, combined computer applications may also incorporate navigation between different combinations of computer applications. Thus, the common interface 100 with its combined network status view 104 and network failure view 106 may be configured to navigate to another combination of computer applications. For example, once a trouble ticket has been created, the common interface 100 may provide a new view combination using the computer applications from the ticket system and the SLA system may be presented. In this way, the common interface 100 may appear to navigate to the new combination. The new view combination may similarly be configured to navigate to additional combinations of computer applications as well. Further, navigation from one combination to another may be invoked from any one of the computer applications in a particular combination.

Additionally, examples may provide tools for configuring each view. Configuring a view may mean defining a filter for executing the associated computer application and configuring the view to show a portion of the widgets available from the associated computer application. In examples, a configuration panel may be provided to configure the combinations of views.

Figure 5:
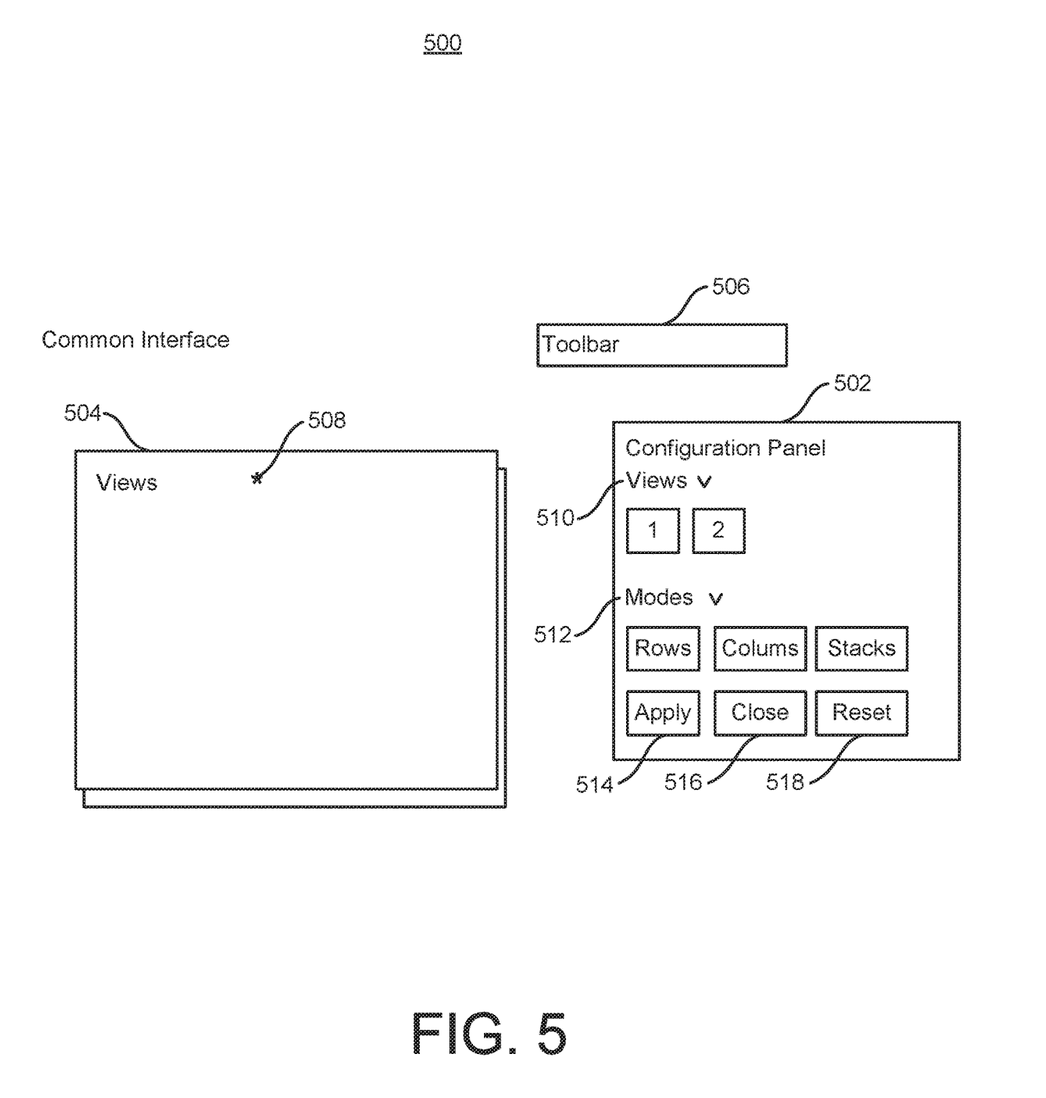
FIG. 5 is an example common interface for combining computer applications with a configuration panel for configuring one or more views.

FIG. 5 is an example common interface 500 for combining computer applications with an example configuration panel 502 for configuring one or more views 504. Similar to the common interface 100, the common interface 500, may include a toolbar 506. The toolbar 506 may provide categorized functions to combine the appearance and functionality of computer applications. In examples, the toolbar 506 may be configured when software products are installed at the common access point. A JavaScript object notation (JSON) definition of an example toolbar is provided in Example XML 1. The Example JSON 1 includes examples of functions that may be provided to configure the combination of computer applications as described herein.

```
"toolbar": {
    "reverse": true,
    "configure": true,
    "edit": true,
    "refresh": true,
    "reset": true,
```

-continued

```
"help":true,
"move": true,
"remove": true,
"layoutModeCol": true,
"layoutModeRow": true,
"layoutModeStack": true,
"layouts": [
    {
        "id": "layout-1-2",
        "name": "Layout 1-2",
        "tooltip": "Apply layout 1-2"
    },{
        "id": "layout-2-1",
        "name": "Layout 2-1",
        "tooltip": "Apply layout 2-1"
    },{
        "id": "layout-2-2",
        "name": "Layout 2-2",
        "tooltip": "Apply layout 2x2"
    },
    {
        "id": "layout-2-dynamic",
        "name": "Layout <>",
        "tooltip": "Apply resizeable layout"
    }
],
"stackPositionTop": true,
"stackPositionBottom": true,
"stackPositionLeft": true,
"stackPositionRight": true,
"stackJustifiedToggle": true,
"stackTypeToggle": true,
"views": [
    {
        "id": "v3-dimfacts-simulation",
        "name": "Technology",
        "icon": "fa fa-line-chart",
        "roles": ["Platform Administrator"],
        "showShadows": true
    } , {
        "id": "v3-dimfacts-simulation",
        "name": "Technology (popup)",
        "icon": "fa fa-line-chart",
        "roles": ["Platform Administrator"],
        "tooltip": "New Technology view in popup",
        "popup": true,
        "popupOptions": {
            "showTitle": true,
            "showHeader": true,
            "title": "<i class=\"fa fa-info-circle\"></i> Technology view in popup (click on the icon to pin this view)",
            "animation": true,
            "backdrop": true,
            "size": "lg",
            "keyboard": true,
            "buttons": {
                "close": true,
                "pin": true
            }
        }
    } , {
        "id": "test-smartbox-1",
        "name": "Smartbox",
        "icon": "fa fa-table",
        "roles": ["Platform Administrator"],
        "showShadows": true
    }, {
        "id": "test-europe-temperatures-1",
        "name": "Europe",
        "icon": "fa fa-thermometer-empty",
        "showShadows": true
    }, {
        "id": "test-europe-temperatures-2",
        "name": "City",
        "icon": "fa fa-thermometer-empty",
        "showShadows": true
    }, {
        "id": "test-europe-temperatures-3",
        "name": "Temperature",
        "icon": "fa fa-thermometer-empty",
        "popup": true
    }, {
        "id": "Data-Exchange-Inspector",
        "name": "Inspector",
        "icon": "fa fa-search",
        "tooltip": "Data Exchange Inspector",
        "showShadows": true
    }
],
"actions": [
    {
        "id": "create-form",
        "name": "Create",
        "type": "objectType" ,
        "class": "btn-info" ,
        "icon": "fa fa-server",
        "tooltip" :"Create a new smartbox",
        "roles":["View Designer"],
        "dataSelection": {
            "typeSelection": {
                "domain": "plugin_simulator",
                "package": "Object_Simulation",
                "type": "virtualSB"
            },
            "formSelection": {
                "id": "create",
                "version": "1.0"
            }
        }
    },{
        "id": "go-to-iot",
        "name": "Go to IoT",
        "type": "navigation" ,
        "class": "btn-info" ,
        "icon": "fa fa-gears",
        "url": "/workspaces/IOT_Demo_WS",
        "tooltip" :"Navigate to IoT Green Coffee workspace"
    },{
        "id": "action",
        "name": "Add",
        "type": "command" ,
        "commandId": "open_view",
        "view":
        {
            "id": "test-europe-temperatures-1",
            "name": "Europe",
            "icon": "fa fa-thermometer-empty"
        }
    },{
        "id": "action",
        "name": "Actions",
        "actions" : [
            {
                "id": "action1",
                "type" : "command",
                "commandId": "set_layout_view",
                "layoutId": "layout-2-1"
            }, {
                "id": "action2",
                "type" : "command",
                "commandId": "open_view",
                "view":
                {
                    "id": "test-europe-temperatures-1",
                    "name": "Europe",
                    "icon": "fa fa-thermometer-empty"
                }
            }, {
                "id": "action3",
                "type" : "command",
                "commandId": "open_view",
                "view":
                {
                    "id": "test-europe-temperatures-2",
                    "name": "Europe",
                    "icon": "fa fa-thermometer-empty"
                }
            }
        ]
```

```
        }
    ]
}
```

Example JSON 1

In addition to using the toolbar 506, examples may provide the configuration panel 502 to configure the views 504 and widgets within the views 504. The configuration panel 502 may be pre-defined and provide online help and configurations similar to the toolbar 506. Additionally, the views 504 and the widgets in the view 504 can be configured with the configuration panel 502. The example configuration panel 502 includes functions for views 510, which may switch the view 504 being configured. In this example, one of two possible views may be selected for configuring, "1" and "2." Additionally, the example configuration panel 502 includes functions for Modes 512, which may configure the layout mode of combined views. In this example, the layout mode may be set to "Rows," "Columns," or "Stacks." Additionally, the configuration panel 502 includes an "Apply" button 514, a "Close" button 516, and a "Reset" button 518. These buttons may respectively apply changes selected in the configuration panel 502 to the views 504, close the configuration panel 502, and roll back changes made in the configuration panel 502. Further, configuration panels, such as the configuration panel 502, may include a uniform resource locator for online help, a directive to open an application programming interface (API) for configuring the views 504. Additionally, the configuration panel 502 may include options to customize the views 504, such as by adding buttons for closing views, executing the associated computer applications, and adding animations to minimize, move, and hover the views 504. In examples, the common access point may include a software development kit to create and maintain configuration panels, such as the configuration panel 502.

In examples, the configuration panel 502 may be presented to the right of the views 504 or widget being configured. Additionally, the configuration panel 502 may be presented on demand, and include selectors, filters, and other configurations. In one example, the views 504 may include an icon 508 which may be clicked to open the configuration panel 502 for the views 504.

In addition to providing toolbar buttons to configure individual features of views, examples may also provide toolbar buttons to automatically present combined views. For example, an analysis button may be added to the toolbar that combines a current view with multiple views in a pre-configured layout. In other words, instead of manually combining and configuring the same views in the same layouts repeatedly, the combination may be assigned to a specific toolbar button. In this way, combinations may be presented with a single click instead of a multi-step configuration.

Combining software products at a common interface may mean providing access to multiple, varied data sources. Such access may be provided because each of the software products installed on the common access point may use their own data source, which may form part of a larger data source. In addition to the software products described with respect to FIG. 1, the common access point may include management systems, accounting systems, control systems, messaging systems, firewalls, security systems, event management systems, and measurement systems, e.g., probes or networks of probes. In addition to the data sources themselves being varied, the configuration of how these data sources are stored and accessed may also vary. For example, one data source may be accessible via a representational state transfer (REST) type API. Another data source may be accessible via a simple object access protocol (SOAP) API. Other example access mechanisms may include the transfer of data files via file transfer protocol (ftp), and database connections such as an open database connectivity (ODBC) link. Accordingly, the common access point may provide an architecture to host such software products.

Figure 6:
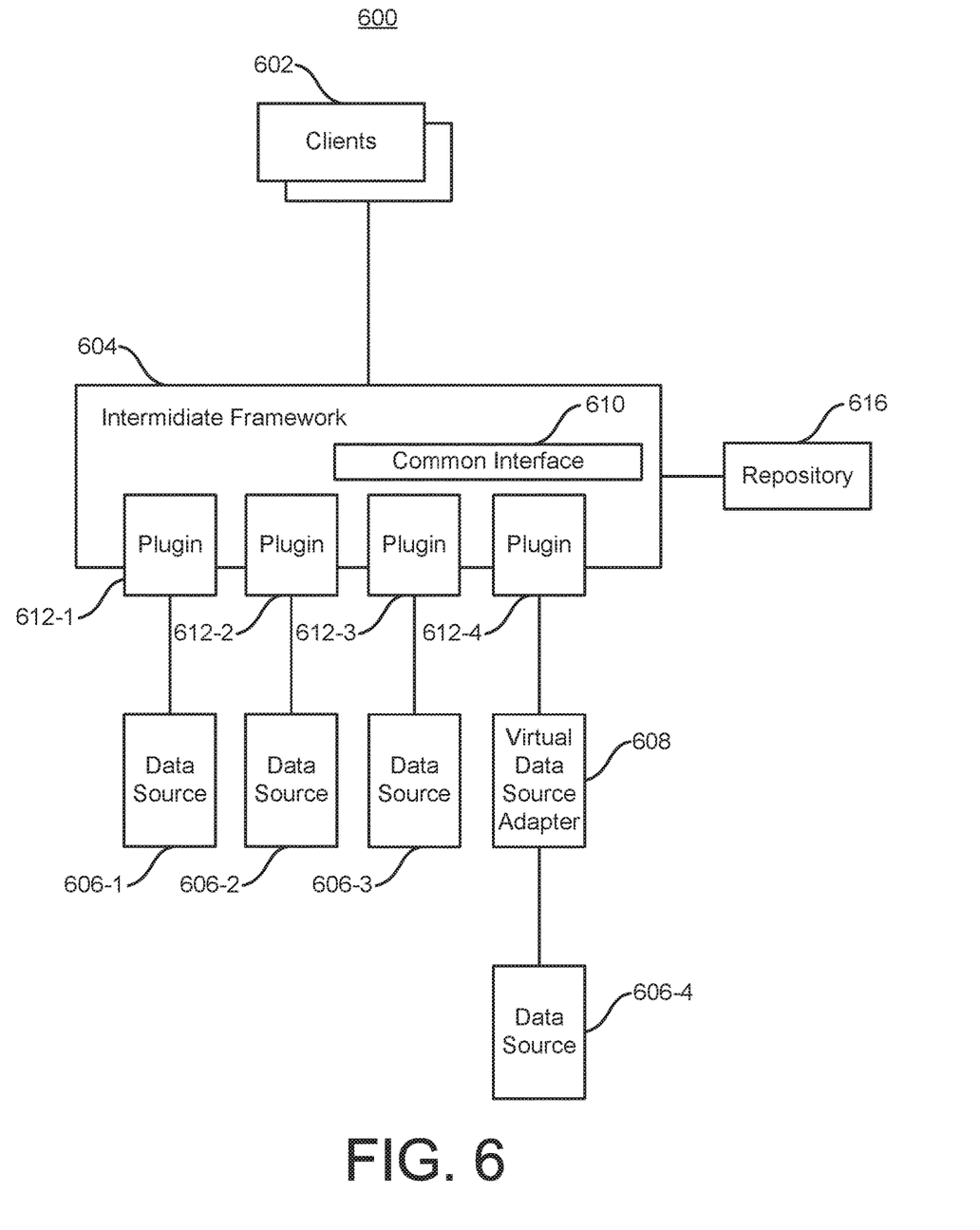
FIG. 6 is an example common access point for combining computer applications.

FIG. 6 is an example common access point 600 for combining computer applications. The common access point 600 may be a networked computer architecture that enables the combination and execution of computer applications from multiple software products. The common access point 600 includes client computing devices 602, an intermediate framework 604, data sources 606-1 to 606-4, and a virtual data source adapter 608. The client computing devices 602 may be computer devices, such as laptop and desktop computers, tablets, smart phones, and the like. The client computing devices 602 may be connected to the intermediate framework 604 over a network, such as the Internet. In this way, the client computing devices 602 may present the user interfaces and views described above that enable the combination and execution of computer applications. The intermediate framework 604 may be a computer system, such as a server or server farm, that hosts a common interface 610 and the software products described above. The common interface 610 may be accessible to the client computing devices 602 for combining and executing the computer applications of the installed software products. The software products may be installed on the intermediate framework 604 as plugins 612. The plugins 612 may include the computer code of the various computer applications that executes and accesses the associated data sources 606.

The data sources 606-1 to 606-4 may be remote data servers that the installed software products use. For example, the assurance system may use a remote assurance server, which includes databases of information about the status of a communication system. In fact, any installed software product may use its own remote data server. Accordingly, each software product may be installed by adding plugins 612 to the intermediate framework 604. The plugins 612 may be the software that retrieves data corresponding to the request from the associated data source 606. In examples, the plugins 612 may access an API, link or other mechanism to communicate with its respective data source 606. For example, plugins 612-1 and 612-2 may communicate via different REST APIs with their respective data sources 606-1, 606-2 while plugin 612-3 may communicate via a SOAP API with its data source 606-3.

In some cases, it may not be possible to for a data source 606-4 to communicate directly with a plugin 612-4. Accordingly, in one example, the plugin 612-4 accesses the virtual data source adapter 608 to communicate with the data source 606-4. The virtual data source adapter 608 may provide responses to requests from the plugin 612-4 on behalf of the data source 606-4. The virtual data source adapter 608 may be installed locally (at the data source 606-4), or at some point between the plugin 612-4 and the data source 606-4. The virtual data source adapter 608 may act as an emulator or translator and provide functionality that the data source 606-4 cannot.

In examples, the intermediate framework 604 can provide access to data sources 606 irrespective of where they are hosted. In one example, one or more of the data sources 606 may be physically remote from the intermediate framework 604. Additionally, one or more of the data sources 606 may be hosted on the same computing system as the intermediate framework 604.

Installing a software product at the common access point 600 may also include defining the user interfaces, views, and widgets that are combined as described above. In one example, these elements are defined by the plugins 612. In another example, these elements are defined at the data source 606 and communicated to the intermediate framework 604 via the respective plugin 612. In one example, the common access point 600 includes a repository 616 of user interfaces, views, and widgets for one or more of the installed software products. Additionally, the repository 616 may include the workspaces and views of combined computer applications that are generated as described above.

In order to combine computer applications as described herein, the intermediate framework 604 may include an API that is invoked by the functions of the toolbars and configuration panels to create dynamic combinations. Such an API may be used to add dynamically new views, clone dynamically existing views, change view layouts, configure the positions of the tabs in stacked layouts to top, bottom, left, or right, configure the stack type to tabs or pills, configure the left-center-right justification of stacks, change or reverse the order of views, expand or collapse a row to column view and provide more screen space for remaining views, maximize or restore views, reset views to roll back all changes, refresh views (and sub-views) to force a data refresh with queries to the data sources 606, invoke a configuration panel, invoke a call to online help, and invoke a call to a view designer. In examples, the intermediate framework 604 may include the view designer (not shown) which may be a computer application for editing views. Editing views may include changing the layout, adding widgets, configuring widgets, and the like.

Figure 7:
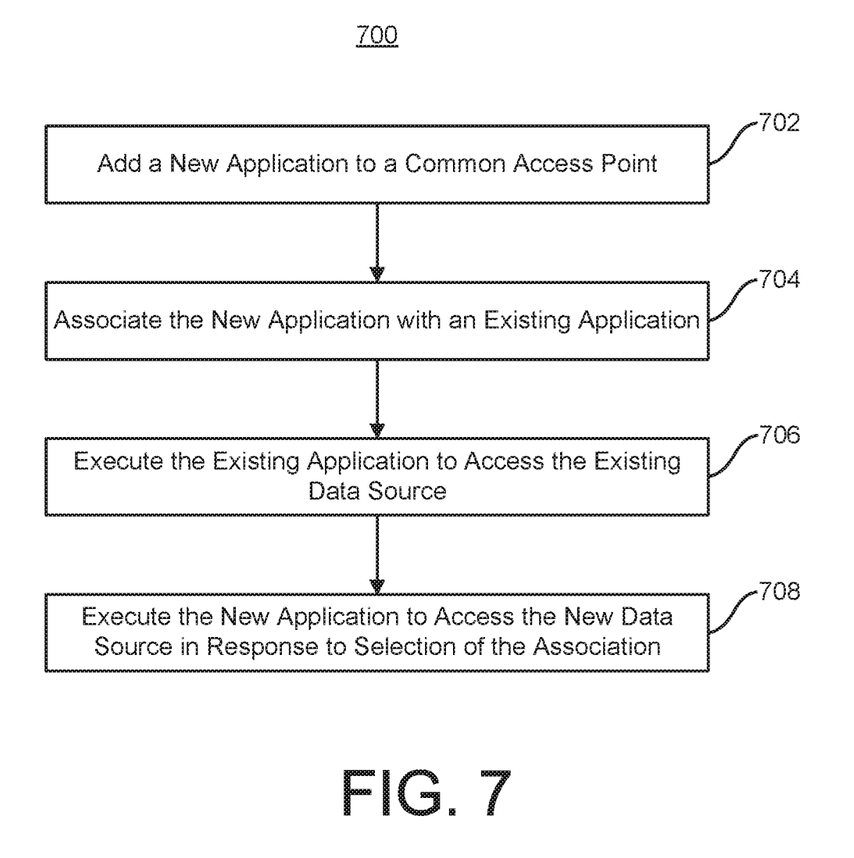
FIG. 7 is an example method for combining computer applications.

FIG. 7 is an example method 700 for combining computer applications. Once a new application is added to a common access point, combinations using the new application may be created. Additionally, combinations may be created using existing applications. Existing applications may be the computer applications of previously installed software products. The method 700 may begin at block 702. At block 702, a new computer application may be added to a common access point, such as the common access point 600. The new computer application may be added manually, or by an automated installer. The new computer application may be one of a suite of computer applications in a software product being installed. For example, the network failure computer application described with respect to FIG. 1 may be added to the common access point 600. In examples, adding a new computer application may include adding a new plugin to an intermediate framework, such as adding the plugin 612-1 to the intermediate framework 604. The plugin 612-1 may be configured to access a data source for the software product, such as the data source 606-1. Further, adding the new computer application may include defining one or more views of the computer application in the plugin 612-1, the data source 606-1, and a repository, such as the repository 616.

Referring back to FIG. 7, at block 704 the new computer application may be associated with an existing computer application by a common interface, such as the common interface 610. In examples, the existing computer application may be the network status computer application described with respect to FIG. 1. In this example, the network status computer application may include the plugin 612-2 configured to access data source 606-2. Associating the new and existing computer applications may mean combining views or portions of views for the different computer applications as described herein. Additionally, associating the new and existing computer applications may mean associating a widget in a view of one computer application to a filter for the other. In the example combined computer applications described with respect to FIG. 1, the list widget 108 of the network status view 104 showing the component names and associated status may be associated with a filter for the network failure computer application.

Referring back to FIG. 7, at block 706, the common interface 610 may execute the existing computer application to access an existing data source. For example, the network status computer application may execute the plugin 612-2 to access the data source 606-2 using the "U.S. West Coast" filter and populate the network status view 104 accordingly.

At block 708, the common interface 610 may execute the new computer application in response to a selection of the association. For example, the association between the network status and network failure computer applications may be selected by double-clicking on a row in the widget 112 using a pointing device, such as a mouse. In response, the common interface 610 may execute the network failure computer application using the data in the selected row as a filter. Thus, the plugin 612-1 may access the data source 606-1 using the component "B" filter. In this way, the network failure computer application may populate the network failure view 106 with the "Component Name" and Priority Level," as described above.

The method 700 is represented in a process flow diagram. However, the process flow diagram of FIG. 7 is not intended to indicate that the method 700 is to include all the blocks shown in FIG. 7 in every case. Rather, any number of additional blocks can be included within the method 700, depending on the details of the specific implementation. Further, the process flow diagram of FIG. 7 is not intended to indicate that the method 700 is only to proceed in the order indicated by the blocks shown in FIG. 7 in every case.

Figure 8:
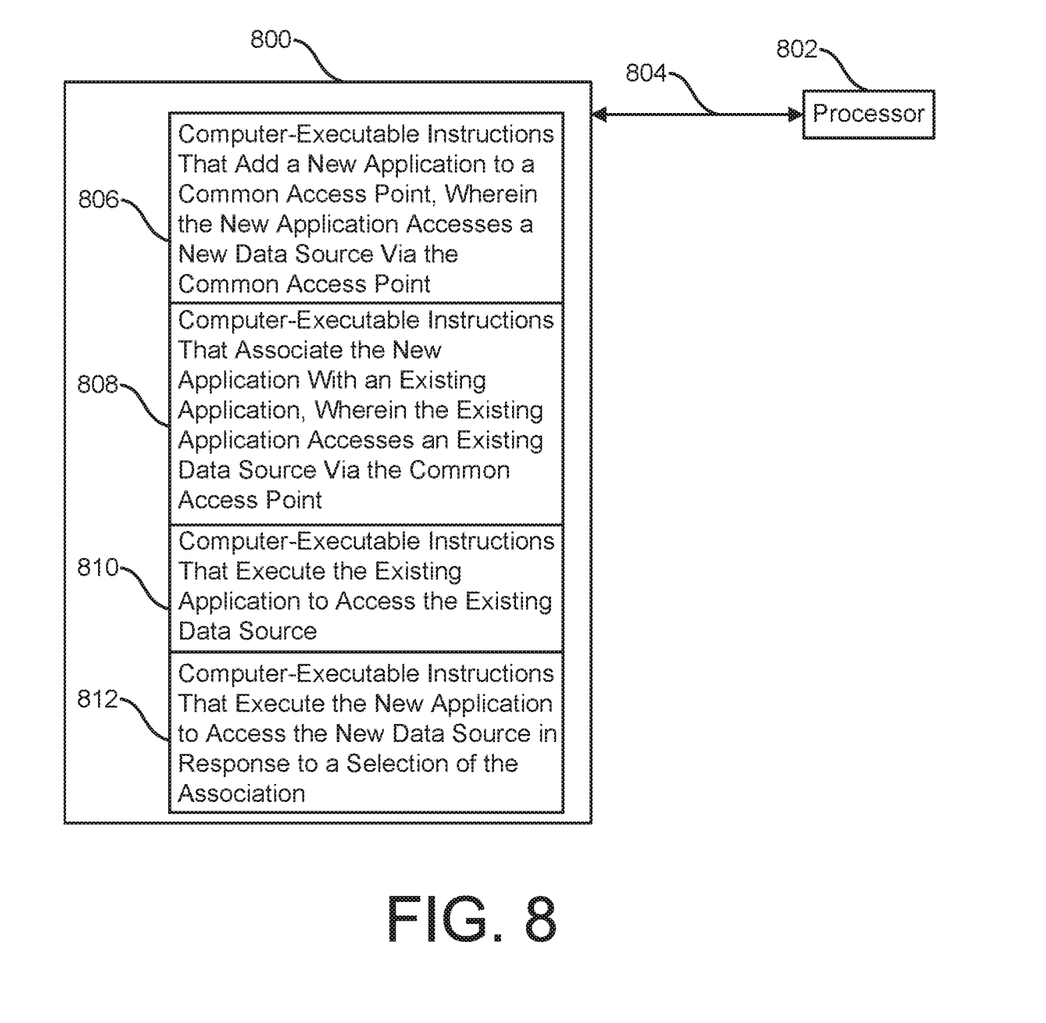
FIG. 8 is an example computing system for combining computer applications.

FIG. 8 is an example computing system for combining computer applications. The computing system includes an example tangible, non-transitory computer-readable medium 800, a processor 802, and a computer bus 804. The tangible, non-transitory computer-readable medium 800 may correspond to any typical computer memory that stores computer-implemented instructions, such as programming code or the like. For example, the tangible, non-transitory computer-readable medium 800 may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The tangible, non-transitory computer-readable medium 800 can be accessed by the processor 802 over the computer bus 804. A region 806 of the tangible, non-transitory computer-readable medium stores computer-executable instructions that add a new computer application to a common access point, wherein the new computer application accesses a new data source via the common access point. The common access point may be a centralized computer architecture that hosts multiple installed software products and the common interface. A region 808 of the tangible, non-transitory computer-readable medium stores computer-executable instructions that associate the new computer application with an existing computer application, wherein the existing computer application accesses an existing data source via the common access point. A region 810 of the tangible, non-transitory computer-readable medium stores computer-executable instructions that execute the existing computer application to access the existing data source. A region 812 of the tangible, non-transitory computer-readable medium stores computer-executable instructions that execute the new computer application to access the new data source in response to a selection of the association.

Although shown as contiguous blocks, the software components can be stored in any order or configuration. For example, if the tangible, non-transitory computer-readable medium 800 is a hard drive, the software components can be stored in non-contiguous, or even overlapping, sectors.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical computer applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for combining computer applications, comprising:
    identifying a network failure in a computer network, wherein the computer network comprises a common access point to the computer applications, and wherein the computer applications work in combination via the access point to fix the network failure;
    adding a new computer application of the computer applications to the common access point, wherein the new computer application accesses a new data source via the common access point;
    associating the new computer application of the computer applications with an existing computer application of the computer applications, wherein the existing computer application of the computer applications accesses an existing data source via the common access point;
    executing the existing computer application of the computer applications to access the existing data source;
    executing the new computer application of the computer applications to access the new data source in response to a first selection of the association;
    receiving a second selection at the common access point; and
    in response to the second selection, initiating an automated correction process corresponding with the network failure.

2. The method of claim 1, wherein the existing computer application of the computer applications comprises an existing widget and an existing plugin.

3. The method of claim 2, wherein the selection of the association comprises selecting an existing item of data from the existing widget.

4. The method of claim 2, wherein the new computer application of the computer applications comprises a new widget and a new plugin, and wherein executing the new computer application of the computer applications comprises populating the new widget with a new item of data by executing the new plugin to generate the new item of data.

5. The method of claim 4, wherein associating the new computer application of the computer applications with the existing computer application of the computer applications comprises associating the existing widget with the new widget.

6. The method of claim 1, wherein associating the new computer application of the computer applications with the existing computer application of the computer applications comprises:
    associating an existing data parameter with the existing data source, wherein the existing computer application of the computer applications accesses the existing data source based on the existing data parameter; and
    associating a new data parameter with the new data source, wherein the new computer application of the computer applications accesses the new data source based on the new data parameter.

7. The method of claim 1, further comprising displaying a new user interface in association with an existing user interface, wherein the new computer application of the computer applications comprises the new user interface, and wherein the existing computer application of the computer applications comprises the existing user interface.

8. The method of claim 1, wherein the new computer application and the existing computer application are different and related software products.

9. The method of claim 1, wherein the new computer application and the existing computer application are developed by different organizations.

10. The method of claim 1, wherein the new computer application corresponds with a ticket system and the existing computer application corresponds with an assurance system.

11. The method of claim 1, wherein the common access point comprises a toolbar, wherein the toolbar comprises menus of categorized functions that combine appearance and functionality of the new computer application and the existing computer application.

12. The method of claim 1, wherein the second selection corresponds with an interface tool to create a trouble ticket in a ticketing system, and wherein the ticketing system and the computer applications are accessible via the common access point.

13. A system, comprising:
    a processor; and
    a memory device comprising computer-implemented code to:
        identify a network failure in a computer network, wherein the computer network comprises a common access point to the computer applications, and wherein the computer applications work in combination via the access point to fix the network failure;
        add a new computer application of the computer applications to the common access point, wherein the new computer application accesses a new data source via the common access point;
        associate the new computer application of the computer applications with an existing computer application of the computer applications, wherein the existing computer application of the computer applications accesses an existing data source via the common access point;

execute the existing computer application of the computer applications to access the existing data source;

execute the new computer application of the computer applications to access the new data source in response to a first selection of the association;

receive a second selection at the common access point; and in response to the second selection, initiate an automated correction process corresponding with the network failure.

14. The system of claim 13, wherein the existing computer application of the computer applications comprises an existing widget and an existing plugin.

15. The system of claim 14, wherein the selection of the association comprises selecting an existing item of data from the existing widget.

16. The system of claim 15, wherein the new computer application of the computer applications comprises a new widget and a new plugin, and wherein the new computer application of the computer applications is executed by populating the new widget with a new item of data by executing the new plugin to generate the new item of data.

17. The system of claim 16, wherein the new computer application of the computer applications is associated with the existing computer application of the computer applications by:

associating an existing data parameter with the existing data source, wherein the existing computer application of the computer applications accesses the existing data source based on the existing data parameter; and associating a new data parameter with the new data source, wherein the new computer application of the computer applications accesses the new data source based on the new data parameter.

18. A non-transitory, computer-readable medium storing computer-executable instructions, which when executed, cause a computer to:

identify a network failure in a computer network, wherein the computer network comprises a common access point to the computer applications, and wherein the computer applications work in combination via the access point to fix the network failure;

add a new computer application of the computer applications to the common access point, wherein the new computer application accesses a new data source via the common access point;

associate the new computer application of the computer applications with an existing computer application of the computer applications, wherein the existing computer application of the computer applications accesses an existing data source via the common access point;

execute the existing computer application of the computer applications to access the existing data source;

execute the new computer application of the computer applications to access the new data source in response to a first selection of the association, wherein:

the existing computer application of the computer applications comprises an existing widget and an existing plugin;

the selection of the association comprises selecting an existing item of data from the existing widget;

the new computer application of the computer applications comprises a new widget and a new plugin, and wherein executing the new computer application of the computer applications comprises populating the new widget with a new item of data by executing the new plugin to generate the new item of data; and associating the new computer application of the computer applications with the existing computer application of the computer applications comprises associating the existing widget with the new widget;

receive a second selection at the common access point; and in response to the second selection, initiate an automated correction process corresponding with the network failure.

19. The non-transitory, computer-readable medium of claim 18, wherein associating the new computer application of the computer applications with the existing computer application of the computer applications further comprises:

associating an existing data parameter with the existing data source, wherein the existing computer application of the computer applications accesses the existing data source based on the existing data parameter; and associating a new data parameter with the new data source, wherein the new computer application of the computer applications accesses the new data source based on the new data parameter.

20. The non-transitory, computer-readable medium of claim 18, storing computer-executable instructions, which when executed, further cause a computer to display a new user interface in association with an existing user interface, wherein the new computer application of the computer applications comprises the new user interface, and wherein the existing computer application of the computer applications comprises the existing user interface.

* * * * *